United States Patent Office 2,777,107
Patented Jan. 8, 1957

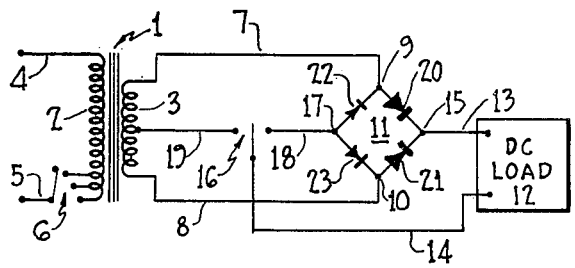
Fig. 1
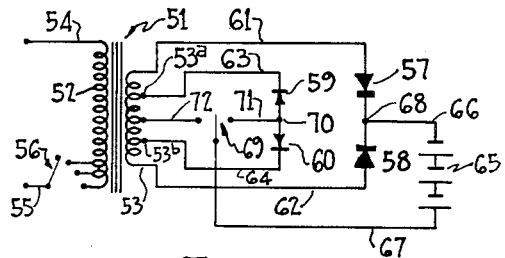
Fig. 2
RECTIFYING UNITS 20, 21 AND 57, 58 PROVIDED WITH GREATER CURRENT CAPACITY THAN RECTIFYING UNITS 22, 23 AND 59, 60 RESPECTIVELY
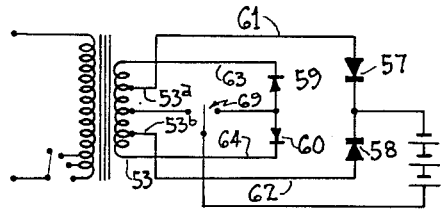
Fig. 3
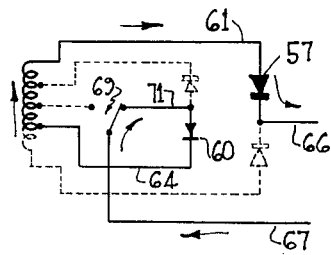
Fig. 2ᵃ
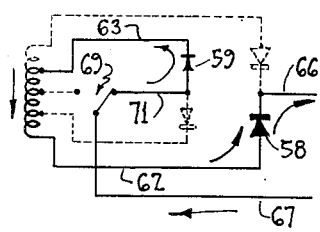
Fig. 2ᵇ
INVENTOR:
LEWIS A. MEDLAR
BY Stone, Boyden & Mack,
ATTY'S.

2,777,107

RECTIFYING SYSTEMS

Lewis A. Medlar, Oreland, Pa., assignor to Fox Products Company, Philadelphia, Pa., a corporation of Pennsylvania Application April 1, 1953, Serial No. 346,158

5 Claims. (Cl. 321—8)

This invention relates to rectifying systems and particularly to improved systems wherein the rectifying units are used to increase efficiency.

The invention is particularly adapted to dual voltage rectifying systems, such as are required, for example, in a battery charger for charging both 6-volt and 12-volt batteries.

One object of the invention is to devise a dual voltage rectifying system which may operate from commercial alternating current outlets to provide either a higher or a lower output voltage with increased rectifier efficiency and optimum utilization of the available power at each voltage commensurate with simplified switching.

A further object is to provide a dual voltage rectifying system employing four rectifying units connected as a bridge rectifier for higher voltage operation and means allowing utilization of only two of the units as a center-tapped rectifier for lower voltage operation, and wherein the output voltages need not bear a 2:1 ratio at a given current level.

Yet another object is to provide a rectifying system employing four bridge-connected rectifier units with different voltages simultaneously applied across the two center-tapped pairs of units making up the bridge.

In order that these and other objects of the invention may be understood in detail, reference is had to the accompanying drawings forming part of this specification and wherein:

Fig. 1 is a schematic diagram illustrating one embodiment of the invention;

Fig. 2 is a schematic diagram of a second embodiment of the invention;

Figs. 2ª and 2ᵇ are diagrams illustrating directions of current flow in the apparatus of Fig. 2, and Fig. 3 is a schematic diagram of a modified form of the apparatus of Fig. 2.

A simple embodiment of the invention, as shown in Fig. 1, comprises a transformer 1 having a primary winding 2 and a center-tapped secondary winding 3. The primary 2 is connected across an alternating current source by a supply circuit including power leads 4 and 5 and a tap switch 6 provided to control the output voltage of the transformer.

The end terminals of secondary 3 of the transformer are connected by conductors 7 and 8 to input terminals 9 and 10, respectively, of a bridge connected rectifier 11. The direct current load circuit of the system, connectable to any load 12, such as a battery to be charged, comprises leads 13 and 14. One side of the load circuit, comprising lead 13, is connected to one output terminal 15 of the bridge 11. The other side, comprising lead 14, is connected by a single pole double throw switch 16 either to the other output terminal 17 of the bridge via conductor 18, or to the center-tap of secondary 3 via conductor 19.

It will be observed that the bridge 11 is made up of two center-tapped pairs of rectifier units, one consisting of units 20 and 21, the other consisting of units 22 and 23.

When switch 16 is actuated to the right as viewed in Fig. 1, so conductor 14 is connected to bridge output terminal 17, both center-tapped pairs of rectifier units are brought into operation. Thus, during one half of the alternating current cycle, current may flow from input terminal 9, through unit 20, lead 13, load 12, lead 14, and unit 23, the rectifier units 21 and 22 being non-conductive for this direction of current flow. During the next half cycle, current flows from input terminal 10, through unit 21, lead 13, load 12, lead 14, and unit 22, the rectifier units 20 and 23 now being non-conductive.

When switch 16 is thrown to the left, connecting lead 14 to the center-tap of secondary 3, only rectifier units 20 and 21 are actively included in the circuit. Then, during one half of the alternating current cycle, rectifier unit 20 passes current to the load, unit 21 being non-conductive for this direction of current flow. During the next half cycle, unit 21 passes current to the load and unit 20 is non-conductive.

When the full bridge rectifier is employed, the full secondary voltage of the transformer is utilized. On the other hand, when only the center-tapped pair comprising units 20 and 21 is employed, only one half, or approximately one half, of the secondary voltage is utilized. Thus, if it is desired to employ the apparatus of Fig. 1 to charge both 12-volt and 6-volt batteries, for example, the circuit can be designed to provide 12 volts when the full bridge rectifier is employed and 6 volts when only the center-tapped pair of rectifying units is employed.

The apparatus described up to this point is well-known and a conventional device for obtaining a two-voltage rectifier power source. The distinctions between the known device as heretofore described and the apparatus of the present invention will be pointed out hereinafter.

It will be understood that when the apparatus of Fig. 1 is employed for charging batteries and for many other purposes, the supply leads 4 and 5 are ordinarily connected to a standard convenience outlet of a commercial alternating current system. Since there is a more or less rigid restriction on the amount of power which may be drawn from a standard outlet, this restriction being imposed by the National Electric Code and the Underwriters' Laboratories, the circuit must be designed so that the maximum power at the 12-volt output is within the allowable limit. Hence, the available power at the 6-volt level would ordinarily be but half that at 12 volts, assuming the current to be the same for each voltage level. And, if the current is simply increased at the lower voltage level, the rectifier efficiency at one voltage level would obviously be poor, where conventional rectifier systems are employed.

By employing a tap switch, as at 6, Fig. 1, the voltage of the full bridge rectifier 11 can be made somewhat higher than actually needed, the current being limited to the maximum dictated by the power source to which the leads 4 and 5 are to be connected, and the circuit may then be operated at the lower voltage at a current on the order of 50–100% higher than the current for high voltage operation, so that a considerably greater utilization of the available power is possible. Then, instead of making all four rectifying units of the bridge-connected rectifier of equal current carrying capacity, I provide units 20 and 21, which by themselves carry the higher current during low voltage operation of the system, with a higher current carrying capacity than the units 22 and 23. Since the series combinations of units 20 and 23 and 21 and 22 are then adequate to carry the lower current at higher voltage, I am able thus to obtain more efficient utilization of the rectifying units.

While the rectifying units 20—23 may be of any suitable type, I prefer to use dry plate rectifying units for such applications as battery charging. Thus, the units 20—23 may be conventional selenium or copper oxide rectifier units. Such rectifiers have a high inverse voltage rating, so that only one rectifier junction need ordinarily be included in series in each arm. But the allowable current densities for the selenium or copper oxide rectifiers are relatively low, and a number of junctions are therefore usually used in parallel in each arm. Thus, for these types of dry plate rectifiers, I may simply employ more junctions in parallel for units 20 and 21, and fewer junctions in parallel for units 22 and 23, so gaining optimum usage of the rectifier plate area. On the other hand, the copper sulfide-magnesium rectifiers have a much higher allowable current density, but a lower inverse voltage rating. Hence, for this type of dry plate rectifier, I employ a number of plates in series, the number of plates being dictated by the voltage to be blocked, and I adjust the current carrying capacity by making the area of each plate of the units 20 and 21 larger than the areas of the individual plates of the units 22 and 23.

Preferably, I employ dry plate rectifiers and so adjust the effective plates areas thereof that the density of current flow in the plates of rectifiers 20 and 21 during low voltage operation at maximum current is substantially equal to the density of current flow in the plates of rectifiers 22 and 23 during higher voltage operation at the lesser maximum current then allowable. I have discovered that, when the apparatus is so constructed that the current densities at lower voltage, higher current and higher voltage, lower current are substantially equal in such manner, there results a decrease in the forward resistance of the dry plate rectifier elements, due to the nature of the current-voltage drop curve in the forward direction, such decreased resistance resulting in a somewhat greater efficiency of the rectifier system as compared to a conventional system having the same plate area.

It is thus seen that, by constructing the apparatus of Fig. 1 in the manner described, I obtain (1) optimum utilization of the available power commensurate with simplified switching, (2) increased utilization of the rectifier material when dry plate rectifying units are employed, and (3) an increase in rectifier efficiency.

In the circuit of Fig. 1, the two voltage outputs must necessarily be related to each other. That is, the higher output voltage must necessarily be substantially twice the lower, at the same current level. Fig. 2 illustrates a further embodiment of the invention wherein the two output voltages may be selected independently of each other. The apparatus of Fig. 2 comprises a transformer 51 having a primary 52 and a secondary 53, the secondary being provided with a center-tap and two taps 53$^a$ and 53$^b$ spaced equally from the center-tap. Primary 52 is connected to any suitable alternating current source by power leads 54 and 55 and tap switch 56.

Rectifying units 57—60 are connected to form a bridge including equal end portions of the secondary winding 53 as conjugate portions of the bridge, in the sense that the end portions are oppositely paired as to their positions in the bridge. Thus, rectifier units 57 and 58 are connected in series opposition across the entire secondary 53 by conductors 61 and 62. Similarly, units 59 and 60 are connected in series opposition between the two taps 53$^a$ and 53$^b$, by conductors 63 and 64, respectively. The load, such as a battery 65 to be charged, is connected to the system by a load circuit comprising conductors 66 and 67, conductor 66 being connected to the junction 68 between rectifying units 57 and 58. Conductor 67 is connected to the movable contact of a single pole double throw switch 69, thence either to the junction 70 between units 59 and 60 via conductor 71, or to the center-tap of secondary 53, via conductor 72.

When switch 69 is actuated to the right, so that the rectifying elements 57—60 are bridge-connected through the equal end portions of secondary 53, the directions of current flow are as illustrated in Figs. 2$^a$ and 2$^b$. Thus, during one half cycle of the alternating current supplied to the transformer, current flows through conductor 61, rectifying unit 57, the load circuit including switch 69 and conductor 71, rectifying unit 60 and conductor 64, as indicated in Fig. 2$^a$. During the next half cycle, current flows through conductor 62, rectifying unit 58, the load circuit including switch 69 and conductor 71, rectifying unit 59 and conductor 63. It will be noted that the voltage applied to the bridge rectifier is thus not the entire secondary voltage, but a portion thereof determined by the spacing of taps 53$^a$ and 53$^b$ from the ends of the secondary winding.

On the other hand, when switch 69 is actuated to the left, only the center-tapped pair of rectifying units 57, 58 is employed, and one half of the full secondary voltage is employed.

It will be obvious from the foregoing that, with the circuit arranged as in Fig. 2, the higher output voltage of the system may be made any value greater than the lower output voltage but must be less than twice the lower voltage. When it is desirable that the higher voltage be greater than twice the lower voltage, the circuit is arranged as shown in Fig. 3. Here, conductors 61 and 62 are connected to taps 53$^a$ and 53$^b$, respectively, of the secondary winding 53, rather than to the end terminals thereof, so that the center-tapped pair of rectifying units 57, 58 is connected across only a portion of the secondary. Conductors 63 and 64 are connected to the end terminals of the secondary, so that the center-tapped pair of rectifying units 59, 60 is connected across the entire secondary. Thus, with switch 69 to the right, the voltage supplied to the full bridge rectifier is derived from the same number of secondary turns as was the case in the arrangement of Fig. 2. But, when switch 69, Fig. 3, is moved to the left, only rectifier units 57 and 58 are used, as a center-tapped rectifier, and the voltage then utilized is derived from only those secondary turns between one of the taps 53$^a$ and 53$^b$ and the center-tap of the secondary. Thus, the higher output voltage of the system may exceed twice the lower output voltage by as much as desired, depending merely upon the spacing of taps 53$^a$ and 53$^b$ from the end terminals of the secondary.

As previously discussed, it is again desirable to make the current carrying capacity of the rectifier units 57 and 58, which carry the higher current by themselves at low voltage operation, greater than the current carrying capacity of the rectifier units 59 and 60. And, where dry plate rectifier units are employed, I prefer to so adjust the areas of the rectifier elements that the current densities for the higher and lower voltage levels are substantially equal, thus not only making the most efficient use of the rectifying material but also improving the efficiency of the rectifier, as previously explained.

The circuits of Figs. 2 and 3 have another distinct advantage when copper sulfide-magnesium rectifier units are employed. Since these units have a relatively low inverse voltage rating, it is ordinarily necessary to employ several junctions in series in each arm of the bridge. In a conventional bridge-connected rectifier, equal numbers of junctions are employed in the four bridge arms, since two arms of the bridge are always blocking the full transformer voltage in parallel. But, as seen in Fig. 2, when full bridge-connection is selected by operation of switch 69, rectifying units 59 and 60 in series block only the partial secondary voltage appearing across taps 53$^a$ and 53$^b$, while only units 57 and 58 in series block the entire secondary voltage. For this reason, fewer junctions may be employed for units 59 and 60, Fig. 2, than for units 57 and 58, Fig. 2. This situation is, of course reversed when the circuit is arranged as in Fig. 3, but fewer junctions need be employed in either case than are necessary in a conventional bridge-connected rectifying system.

For simplicity, I have described the taps 53$^a$ and 53$^b$ as "equally removed" from the ends of the secondary winding, or "spaced equally" from the center-tap. It will be understood that the taps 53ᵃ and 53ᵇ are equally removed from the secondary ends, or from the center-tap, in voltage, and that aside from this factor their physical position is unimportant.

I claim:

1. A rectifying system for operation from a source of alternating current power of given magnitude at both a higher and a lower output voltage with optimum power utilization at each output voltage, comprising the combination of a transformer having a primary and a center-tapped secondary, a supply circuit for connecting said primary to the alternating current source, four rectifying units, circuit means connecting two of said units in series opposition between points on said secondary equidistant from said center-tap, circuit means connecting the other two of said units in series opposition between points on said secondary equally spaced from said first mentioned points and in opposite polarity to said first-mentioned two units, and a direct current load circuit having one side connected to the junction between said first mentioned two units, the other side of said load circuit including means for selectively connecting the same to the junction between said other two units for higher voltage operation and to the center-tap of said secondary for lower-voltage operation, whereby the rectifying units are connected in bridge relationship for higher voltage operation.

2. In a dual voltage battery charger, the combination of a transformer having a primary and a center-tapped secondary, means for connecting said primary to a source of alternating current, four dry plate rectifying units, circuit means connecting two of said units in series opposition across said entire secondary, circuit means connecting the other two of said units in series opposition between points on said secondary equally removed from the ends thereof and in opposite polarity to said first-mentioned two units, and a direct current circuit for connection to the battery to be charged, one side of said direct current circuit being connected to the junction between said first mentioned two units, the other side of said direct current circuit including means for selectively connecting the same to the junction between said other two units for higher voltage operation and to the center-tap of said secondary for lower voltage operation, whereby the rectifying units are connected in bridge relationship for higher voltage operation.

3. In a dual voltage rectifying system, the combination of a transformer having a primary and a center-tapped secondary, means for connecting said primary to a source of alternating current, four rectifying units, circuit means connecting two of said units in series opposition between the end terminals of said secondary, circuit means connecting the other two of said units in series opposition between points on said secondary equally removed from the ends thereof and in opposite polarity to said first-mentioned two units, and a direct current load circuit having one side connected to the junction between said other two units, the other side of said load circuit including means for selectively connecting the same to the junction between said first mentioned two units for higher voltage operation and to the center-tap of said secondary for lower voltage operation, whereby the rectifying units are connected in bridge relationship for higher voltage operation.

4. In a dual voltage rectifying system, the combination of a transformer having a center-tapped secondary winding, four unidirectional conducting units forming a rectifying apparatus, circuit means connecting said units to form a bridge including equal end portions of said secondary winding as conjugate portions of the bridge, a direct current load circuit having one side connected to one output terminal of said bridge, the other side of said load circuit including means for selectively connecting the same to the other output terminal of said bridge and to the center-tap of said secondary winding, and means including the primary of the transformer for adjusting the voltage applied to the rectifier apparatus.

5. The apparatus of claim 1 in which said first-mentioned two units have a current-carrying capacity exceeding that of said other said two units.

References Cited in the file of this patent

UNITED STATES PATENTS

| Number | Name | Date |
|---|---|---|
| 846,672 | Koch | Mar. 12, 1907 |
| 930,325 | Thomas | Aug. 3, 1909 |
| 1,829,603 | Mulder et al. | Oct. 27, 1931 |
| 2,270,697 | Clark | Jan. 20, 1942 |
| 2,286,499 | Mittlemann | June 16, 1942 |

OTHER REFERENCES

Radio Amateur's Handbook, 23rd ed. (1946), page 184.